United States Patent
Chapaton et al.

(10) Patent No.: US 10,358,540 B2
(45) Date of Patent: Jul. 23, 2019

(54) PROCESS AND SYSTEM FOR REDUCING VOLATILE COMPOUND EMISSIONS FROM A PRODUCT

(71) Applicant: GM Global Technology Operations LLC, Detroit, MI (US)

(72) Inventors: Thomas J Chapaton, Sterling Heights, MI (US); Wayne E Reeder, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 26 days.

(21) Appl. No.: 15/618,550

(22) Filed: Jun. 9, 2017

(65) Prior Publication Data

US 2018/0355141 A1    Dec. 13, 2018

(51) Int. Cl.
  *C08J 11/02*  (2006.01)
  *B01D 3/14*  (2006.01)
  *B01D 1/00*  (2006.01)
  *B01D 3/06*  (2006.01)

(52) U.S. Cl.
  CPC ............. *C08J 11/02* (2013.01); *B01D 1/0017* (2013.01); *B01D 3/06* (2013.01); *B01D 3/14* (2013.01)

(58) Field of Classification Search
  CPC .................................. C08J 11/02; B01D 3/14
  USPC .......................................... 523/340; 202/205
  See application file for complete search history.

(56) References Cited

U.S. PATENT DOCUMENTS

| | | | | |
|---|---|---|---|---|
| 3,684,553 A | * | 8/1972 | Van Dyk | B05D 7/16 216/75 |
| 2015/0329516 A1 | * | 11/2015 | Hagen | C08G 63/08 203/91 |

FOREIGN PATENT DOCUMENTS

| | | |
|---|---|---|
| AT | 411161 B | 10/2003 |
| DE | 3914712 A1 | 11/1989 |
| DE | 4221681 A1 | 1/1994 |
| DE | 19634725 A1 | 3/1998 |
| DE | 19646834 A1 | 5/1998 |
| DE | 10324098 A1 | 12/2004 |
| DE | 102005013701 A1 | 9/2006 |
| DE | 102008023702 A1 | 11/2008 |
| DE | 102013210180 A1 | 12/2014 |
| DE | 102015110983 A1 | 1/2017 |
| EP | 1214181 A1 | 6/2002 |
| WO | 2013045623 A2 | 4/2013 |

OTHER PUBLICATIONS

Vercet Lactides Technical Data Sheet (Year: 2017).*

* cited by examiner

*Primary Examiner* — Edward J Cain
(74) *Attorney, Agent, or Firm* — Reising Ethington P.C.

(57) ABSTRACT

Volatile compound emissions from a product that comprises a polymeric material may be reduced or eliminated from the product by heating the product in a subatmospheric pressure environment. The product may be heated in the subatmospheric pressure environment at a temperature sufficient to vaporize a volatile compound contained within the polymeric material such that vapors of the volatile compound are extracted or released from the product.

20 Claims, 3 Drawing Sheets

PROCESS AND SYSTEM FOR REDUCING VOLATILE COMPOUND EMISSIONS FROM A PRODUCT

TECHNICAL FIELD

The present disclosure relates generally to a process and an apparatus for reducing the emissions of volatile compounds from products fabricated with polymeric materials.

INTRODUCTION

Polymeric materials are used in a variety of applications, including the manufacture of plastics, fibers, paints, adhesives, elastomers, rubbers, foams, and coatings. Such materials are formed by a polymerization, crosslinking, or curing process in which many small molecules known as monomers react with each other or with other intermediate reaction products to form polymers, or large macromolecules composed of multiple repeating units. In practice, an organic solvent, catalyst, or initiator may be used as a polymerization aid. During manufacture, polymers are typically combined or blended with additives, modifiers, plasticizers, reinforcing materials, or fillers to tailor the chemical, mechanical, physical, cosmetic appearance, and/or processing characteristics of the resulting polymeric materials.

Products made of or containing polymeric materials may emit volatile compounds under certain conditions over time. These volatile compounds may comprise, for example, residual unreacted monomers, formed dimers, oligomers, additives, modifiers, moisture, solvents, residual catalysts, reaction by-products, and decomposition products of the polymeric materials themselves. Some of these volatile compounds may be trapped within the polymeric materials during product manufacture and may slowly evolve therefrom over time, while others may be generated after product manufacture upon exposure to certain environmental conditions.

SUMMARY

Volatile compound emissions from a product that comprises a polymeric material may be reduced or eliminated from the product by a process wherein the product is placed within a chamber, a subatmospheric pressure environment is established within the chamber, and the product is heated within the chamber to a temperature sufficient to vaporize a volatile compound contained within the polymeric material such that vapors of the volatile compound are extracted or released from the product. A gaseous stream comprising vapors of the volatile compound are then withdrawn from the chamber and optionally condensed to a liquid phase to produce a liquid condensate comprising the volatile compound. The liquid condensate may be delivered to a storage tank for further processing.

The polymeric material may comprise at least one polymer or copolymer selected from the group consisting of: acetals; acrylics; acrylonitrile-butadiene-styrene; alkyds; diallyl phthalate; epoxy; fluorocarbons; melamine-formaldehyde; nitrile resins; phenolics; polyamides; polyamide-imide; poly(aryl ether); polycarbonate; polyesters; polyimides; polymethylpentene; polyolefins; polyphenylene oxide; polyphenylene sulfide; polyurethanes; silicones; styrenics; sulfones; urea-formaldehyde; vinyls; and combinations thereof.

In one form, the volatile compound extracted from the product may have a normal boiling point less than 100° C. at standard atmospheric pressure. In another form, the volatile compound extracted from the product may be an organic compound and may have a normal boiling point greater than or equal to 100° C. at standard atmospheric pressure and a vapor pressure less than or equal to 5 mmHg at 20° C. The product may be heated within the chamber at a temperature below the normal boiling point of the volatile compound.

In one form, the product may comprise a fiber reinforced polymer and the volatile compound may comprise a styrenic compound. In such case, the fiber reinforced polymer may be exposed to a subatmospheric pressure of less than or equal to 2 mmHg within the chamber and heated at a temperature greater than or equal to 150° C. to vaporize the styrenic compound.

In another form, the polymeric material may comprise a polymeric adhesive or sealer and the volatile compound may comprise an organic solvent and/or a plasticizer. In such case, the product may be exposed to a subatmospheric pressure of less than or equal to 2 mmHg within the chamber and heated at a temperature greater than or equal to 125° C. to vaporize the organic solvent and/or the plasticizer.

In one form, the the volatile compound may comprise a compound having a heat of vaporization in the range of 5 kJ/mol to 150 kJ/mol.

In one specific example, the product may comprise a vehicle body panel or a vehicle shell.

DETAILED DESCRIPTION

Figure 1:
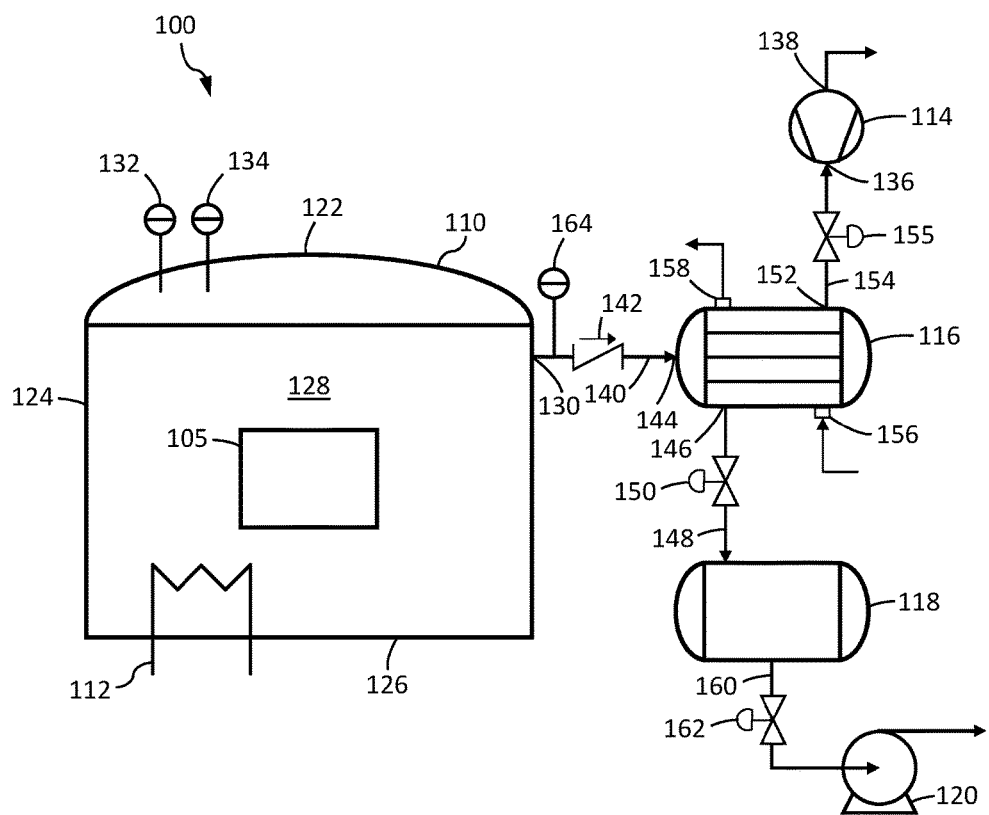
FIG. 1 is a schematic illustration of a system for extracting volatile compounds from products comprising polymeric materials.

Emissions of volatile compounds from products made of or containing polymeric materials can be eliminated, reduced, or controlled by a process in which the products are heated in a vacuum or a subatmospheric pressure environment for a time sufficient to extract or release volatile compounds from the polymeric materials. The temperatures and pressures employed during the volatile compound extraction process may be selected to allow for the release of certain volatile compounds from the products without impacting various properties, including the structural integrity, dimensional stability, or overall robustness of the products. The volatile compounds released from the polymeric materials may be condensable and may be captured or recovered by condensing the volatile compounds to a liquid phase. The captured or recovered liquid phase may be recycled and reused, for example, in the manufacture of other polymeric materials. The volatile compound extraction process may be performed on one or more intermediate or finished products and may be performed at any suitable stage of the product manufacturing process.

As used herein, the term "polymeric material" means any material that comprises or contains a polymer and may include composite materials that include a combination of a polymer and a non-polymeric material. The term "polymer" is used in its broad sense to denote both homopolymers and heteropolymers. Homopolymers are made of a single type of polymer, while heteropolymers (also known as copolymers) are made of two (or more) different types of monomers. The polymeric materials described herein may include one or more of the following thermosetting or thermoplastic polymers: acetals, including polyoxymethylene (POM); acrylics, including poly(methyl methacrylate) and poly(methyl acrylate); acrylonitrile-butadiene-styrene; alkyds; diallyl phthalate; epoxy; fluorocarbons, including poly(tetrafluoroethylene), poly(chlorotrifluoroethylene), perfluoroalkoxy resin, fluorinated ethylene-propylene resin, poly(vinylidene fluoride), ethylene-chlorotrifluoroethylene copolymer, ethylene-tetrafluoroethylene copolymer, and poly(vinyl fluride); melamine-formaldehyde; nitrile resins; phenolics; polyamides; polyamide-imide; poly(aryl ether); polycarbonate; polyesters; polyimides; polymethylpentene; polyolefins, including polyethylene, polypropylene, polybutylene, and polyallomers; polyphenylene oxide; polyphenylene sulfide; polyurethanes; silicones; styrenics, including polystyrene, styrene-acrylonitrile copolymer, and styrene-butadiene copolymer; sulfones, including poly(ether sulfone), poly (phenyl sulfone), and polysulfone; block copolymers; urea-formaldehyde; and vinyls, including polyvinyl acetate, polyvinyl chloride, polyvinylidene chloride, polyvinyl butyrate, polyvinyl formal, and polyvinyl alcohol.

Products may be formed from polymeric materials or they may be assembled from a combination of polymeric materials and non-polymeric materials. Some examples of polymeric material forming processes include molding, extrusion, casting, and drawing. Some polymeric materials may comprise composite materials, which may include a polymer matrix phase and a reinforcement phase of fibers or particles dispersed throughout the continuous polymer matrix phase. The reinforcement phase may comprise a polymeric material or a non-polymeric material, such as glass, aramid, or carbon, for example. In one form, the reinforcement phase may comprise a plurality of short or continuous fibers bound together by the polymer matrix phase, and thus may be referred to as a fiber-reinforced polymer. Some examples of composite manufacturing processes include sheet molding, injection molding, resin transfer molding, pre-preg lay-up, pultrusion, filament winding, and thermal forming. Some polymeric materials may be formulated for use as adhesives or sealants and may be used to attach or to form a seal between two or more polymeric or non-polymeric materials.

Volatile compounds may be incorporated into products made of or containing polymeric materials and may exist within the products even after the polymeric materials are cured (polymerized). Without intending to be bound by theory, it is believed that the presence of volatile organic or inorganic compounds within polymeric materials can be attributed to the precursor compositions used to make the polymeric materials. For example, some polymeric materials are intentionally formed from polymeric precursor compositions that include a stoichiometric excess of one or more liquid reactants, e.g., a stoichiometric excess of monomers or polymers. In addition, certain polymeric precursor compositions may include liquid additives or modifiers, e.g., organic solvents and/or plasticizers that do not participate in the polymerization reaction, but are added for the purpose of adjusting the rheological or thixotropic properties of the precursor compositions. Therefore, because these precursor compositions may contain one or more liquid components that are not used up or otherwise eliminated during polymerization, the resulting polymeric materials may contain residual liquid components, which may evaporate or otherwise physically evolve from the polymeric materials under certain temperature and pressure conditions, even after polymerization is complete.

Some examples of liquid components that may be present in cured or partially cured polymeric materials include: residual monomers or oligomers, residual catalysts or initiators, plasticizers, solvents, e.g., organic solvents, and intermediate reaction products. Some examples of residual monomers that may be present in cured or partially cured polymeric materials include: alcohols, aldehydes (e.g., formaldehyde), alkenes, amides, amines, anhydrides, aromatic hydrocarbons, carboxylic acids, dienes, esters, ethers, imines, isocyanates, ketones, nitriles, and phenols (e.g., phenol formaldehyde). Some examples of catalysts or initiators used in polymeric precursor compositions include: organometallic compounds, transition metals, transition metal halides, peroxides, free-radical initiators, and ionic initiators. Specific catalysts or initiators include: carbon disulfide and carbonyl sulfide. Some examples of plasticizers used in polymeric precursor compositions include: adipates, azelates, benzoates, epoxy, esters, mellitates, trimellitates, phosphates, phthalates, polybutene, sebacates, sulfonamides, terephthalates, and orthophthalates. Some specific examples of plasticizers include: 2,2,4-trimethyl-1, 3-pentanediol diisobutyrate (TXIB) and tris-decyl benzene-1,2,4-tricarboxylate or tridecyl trimellitate (TDTM). Some examples of organic solvents used in polymeric precursor compositions include: alcohols, acetates, saturated, unsaturated, and aromatic hydrocarbons, ethers, and esters. Some specific examples of compounds that may be present in cured or partially cured polymeric materials include: saturated hydrocarbons (paraffins, alkanes, or cycloalkanes), such as butane, pentane, hexane, heptane, octane, (nonane), decane, pentadecane, and hexadecane; unsaturated hydrocarbons (olefins, alkenes, or alkynes), such as butene, isobutylene, 1,3-butadiene, propene, ethylene, and pentene; aromatic hydrocarbons (arenes), such as benzene, toluene, xylene, styrene, naphthalene, biphenyl, and phenol; halogenated hydrocarbons; formic acid; and methanol.

The volatile organic or inorganic compounds that may be vaporized, removed, and subsequently recovered via condensation from products comprising polymeric materials may exhibit relatively high boiling points and relatively low vapor pressures, and thus may diffuse relatively slowly from cured or partially cured polymeric materials at standard temperature and pressure conditions. In one form, the volatile organic or inorganic compounds may have boiling points greater than or equal to 100° C. at standard atmospheric pressure (i.e., 760 mmHg, 101.3 kPa, or 14.7 psi) and/or vapor pressures less than or equal to 5 mmHg at 20° C. The boiling point of a compound at standard atmospheric pressure may be referred to as the "normal" boiling point of the compound. For example, the boiling point of the volatile organic or inorganic compounds at standard atmospheric pressure may be greater than or equal to 125° C., 150° C., or 200° C.; less than or equal to 400° C., 350° C., or 300° C.; or between 125° C. to 400° C., 150° C. to 350° C., or 200° C. to 300° C. In addition, the vapor pressure of the volatile organic or inorganic compounds at 20° C. may be greater than 0 mmHg, greater than or equal to $10^{-7}$ mmHg, or greater than or equal to $10^{-4}$ mmHg; less than or equal to 5 mmHg, 1 mmHg, or 0.1 mmHg; or between 0 mmHg and 5 mmHg, $10^{-7}$ mmHg and 1 mmHg, or $10^{-4}$ mmHg and 0.1 mmHg. In one specific example, the volatile organic or inorganic compounds may have boiling points greater than 250° C. at standard atmospheric pressure and/or vapor pressures less than or equal to 0.1 mmHg at 20° C.

In some situations, the volatile organic or inorganic compounds that may be vaporized, removed, and subsequently recovered via condensation from products comprising polymeric materials may exhibit relatively low boiling points and relatively high vapor pressures, but may not be readily released from the products at standard temperature and pressure conditions due to the chemical and/or mechanical properties of the products, the physiochemical properties of the volatile compounds, and/or the presence of other volatile compounds within the product. For example, the rate at which a volatile compound may be extracted from a polymeric material in a product may depend upon one or more of the following properties of the polymeric material: density, porosity, affinity for the volatile compound, diffusion coefficient, geometry and/or dimensions. In addition, the rate at which a volatile compound may be extracted from a polymeric material may depend upon one or more of the following properties of the volatile compound: molecular weight, structure, volatility, and adsorption coefficient. In one form, these volatile organic or inorganic compounds may have boiling points less than 100° C., or even less than 25° C. at standard atmospheric pressure (i.e., 760 mmHg, 101.3 kPa, or 14.7 psi). In such case, the presently disclosed extraction process may be employed to actively eliminate these volatile organic or inorganic compounds from products.

The volatile organic or inorganic compounds that may be vaporized, removed, and subsequently recovered via condensation from products comprising polymeric materials also may exhibit a heat of vaporization ($\Delta H_{vap}$) in the range of 5 kJ/mol to 150 kJ/mol, in range of 10 kJ/mol to 100 kJ/mol, or in the range of 30 kJ/mol to 60 kJ/mol.

The emission of volatile organic or inorganic compounds from a product that comprises a polymeric material may be eliminated, reduced, or controlled by extracting the volatile organic or inorganic compounds from the product. In general, a target volatile organic or inorganic compound may be extracted, and optionally recovered, from a product that comprises a polymeric material by: (i) enclosing the product in a chamber, (ii) establishing a vacuum or a subatmospheric pressure environment within the chamber, (iii) heating the product to a temperature sufficient to vaporize the target compound within the product such that vapors of the target compound are released from the product, and (iv) continuously removing the released vapors from the chamber as an effluent stream. Thereafter, the vapors of the target compound released from the product may be recovered, for example, by cooling the vapors to a temperature below a boiling point of the vapors to condense the vapors within the effluent stream to produce a liquid condensate comprising the target compound. In situations where the effluent stream contains two or more target compounds with different boiling points, a first liquid condensate may be recovered from the stream by cooling the stream to a first temperature and a second liquid condensate may be recovered from the stream by subsequently cooling the stream to a second temperature lower than the first temperature. This may be accomplished by passing the stream through two or more serially arranged condensers or by delivering the stream to a distillation column designed to separate multiple volatile compounds from each other. In one form, the vapors of the target compound released from the product may be incinerated.

The effective extraction of volatile compounds from the product is accomplished by controlling the pressure within the chamber, the temperature of the product during the extraction process, and the amount of time the product is exposed to such temperatures and pressures. In one form, the product is heated in the chamber during the extraction process to a temperature equal to or greater than the boiling point(s) of the volatile compound(s) selected for extraction. The boiling point of a specific volatile compound will depend upon the pressure of its surrounding environment, in this case the pressure within the chamber. The boiling point of a volatile compound at a given pressure may be determined from experimental data or may be calculated, for example, using the Clausius-Clapeyron equation:

$$\ln\frac{P_1}{P_2} = \frac{\Delta H_{vap}}{R}\left(\frac{1}{T_2} - \frac{1}{T_1}\right) \quad (1)$$

where $\Delta H_{vap}$ is the enthalpy (heat) of vaporization of a specific volatile compound (in J/mol), is the gas constant (~8.3145 J/mol·K), and $P_1$ and $P_2$ are the vapor pressures of the volatile compound (in mmHg) at two different temperatures $T_1$ and $T_2$ (in Kelvin). Therefore, if the heat of vaporization ($\Delta H_{vap}$) of the volatile compound is known, as well as its vapor pressure ($P_1$) at a specific temperature ($T_1$), then we can calculate the temperature ($T_2$) at which the volatile compound must be heated to volatilize the compound at a given pressure ($P_2$). Other equations alternatively may be used to calculate the boiling point of a volatile compound at a given pressure, such as the Antoine, Riedel, and Wagner equations or the Design Institute for Physical Properties (DIPPR) correlation. For the heat of vaporization and vapor pressure of various organic and inorganic compounds, as well as the constants required in the Antoine, Riedel, and/or Wagner equations and/or the DIPPR correlation, see Don. W. Green et al., *Perry's Chemical Engineers' Handbook*, 8th Ed., 2008, pp. 2-55-79, 2-145-155, and 2-477-478; the *CRC Handbook of Chemistry and Physics*; and James G. Speight, *Lange's Handbook of Chemistry*, 16th Ed., 2005.

In one form, the product may be heated in the chamber during the extraction process to a temperature equal to or greater than 50° C. and at a pressure less than or equal to 5 mmHg. For example, the product may be heated in the chamber during the extraction process to a temperature equal to or greater than 50° C., 100° C., 125° C., or 150° C., but preferably less than or equal to 300° C., 200° C., or 175° C. At the same time, the product may be exposed to a subatmospheric pressure less than or equal to 5 mmHg, 2 mmHg, 1 mmHg, or 0.1 mmHg, but preferably greater than 0 mmHg, $10^{-7}$ mmHg, or $10^4$ mmHg.

The product may be exposed to certain desired temperature and pressure conditions for a time sufficient to effectively reduce the amount of certain volatile compounds embodied within the product. The time required to effectively reduce the amount of certain volatile compounds embodied within the product may depend on the temperature and pressure employed during the extraction process, as well as the chemical and mechanical properties of the product, the physiochemical properties of the volatile compound, and the presence of any other volatile compounds. For example, the rate at which a volatile compound may be extracted from a polymeric material may depend upon one or more of the following properties of the polymeric material: density, porosity, affinity for the volatile compound, diffusion coefficient, geometry and/or dimensions. In addition, the rate at which a volatile compound may be extracted from a polymeric material may depend upon one or more of the following properties of the volatile compound: molecular weight, structure, volatility, and adsorption coefficient. The retention time of a product within a select temperature and pressure environment may be need to be evaluated and controlled or adjusted based upon the observed extraction or evaporation rate of the target volatile compound(s).

FIG. 1 illustrates in schematic fashion a system 100 for extracting volatile compounds from products fabricated with polymeric materials to eliminate or reduce the subsequent, uncontrolled emission of such compounds therefrom. The system 100 includes a distillation chamber 110, a heater 112, a vacuum pump 114, a condenser 116, a storage tank 118, and a discharge pump 120.

The distillation chamber 110 includes a roof 122, sidewalls 124, and a floor 126 that define an interior 128 of the distillation chamber 110, and an outlet 130 through which a gaseous stream may be evacuated from the distillation chamber 110. A temperature sensor 132 and a pressure sensor 134 may be coupled to the distillation chamber 110 to measure the temperature and pressure within the interior 128 of the distillation chamber 110 and to communicate those measurements to a microprocessor or electronic control module (ECM) (not shown). The distillation chamber 110 is configured to contain and enclose within its interior 128 a product 105 that is made of or that contains a polymeric material, and thus may include one or more volatile compounds that may be released or may evolve from the product 105 under certain temperature and pressure conditions. The distillation chamber 110 may be designed to contain an individual product 105 or multiple products (not shown) at a time. The specific configuration of the distillation chamber 110 will depend upon the shape and size of the product 105 or products to be treated, and thus may be different from that illustrated in FIG. 1.

The heater 112 is configured to heat a product 105 contained within the distillation chamber 110 to a temperature sufficient to vaporize a volatile compound embodied in the product 105 such that vapors of the volatile compound are released from the product 105. The heater 112 may or may not be located within the interior 128 of the distillation chamber 110 and may comprise any heat source or any combination of heat sources that can raise the temperature of a product 105 contained within the distillation chamber 110 or the temperature of the overall interior 128 of the distillation chamber 110 to a certain desired temperature. For example, the heater 112 may comprise one or more fuel-fired burners, electrical resistance heating elements, induction heating elements, a source or electromagnetic radiation, or a combination thereof.

The vacuum pump 114 includes an inlet 136 in which a gaseous stream is received and an outlet 138 through which a gaseous stream is exhausted, with the inlet 136 of the vacuum pump 114 being in fluid communication with the outlet 130 of the distillation chamber 110. The vacuum pump 114 is configured to establish a vacuum or a subatmospheric pressure environment within the interior 128 of the distillation chamber 110 such that a product 105 disposed within the chamber 110 is exposed to the subatmospheric environment. In one form, the vacuum pump 114 may be part of an overall air evacuation, filtration, and treatment system (not shown). In combination, the heater 112 and the vacuum pump 114 are configured to expose a product 105 contained within the interior 128 of the distillation chamber 110 to a temperature and pressure sufficient to vaporize or volatilize a volatile compound embodied in the product 105 such that vapors of the volatile compound are extracted or released from the product 105. The vacuum pump 114 also may be configured to transport or evacuate the released volatile compound vapors from the interior 128 of the distillation chamber 110 as an effluent stream. The effluent stream may be evacuated from the distillation chamber 110 and transported to the condenser 116 via a conduit 140. The conduit 140 may include a one-way check valve 142 to prevent backflow in situations where the pressure in the condenser 116 exceeds the pressure in the interior 128 of the distillation chamber 110.

The condenser 116 includes an inlet 144 in fluid communication with the outlet 130 of the distillation chamber 110 and an outlet 146 in fluid communication with the storage tank 118. The condenser 116 is configured to receive an effluent stream from the distillation chamber 110 and to condense the released volatile compound vapors in the stream to a liquid phase referred to as a condensate. The condenser 116 also may be configured to separate the liquid condensate from the remaining components in the effluent stream. The liquid condensate comprising the volatile compound may be discharged from the condenser 116 via the outlet 146 and transported to the storage tank 118 via a conduit 148. A valve 150 may be disposed within the conduit 148 to control the flow of liquid from the condenser 116 to the storage tank 118. In addition, the condenser 116 may include a vacuum port 152, which may be coupled to the inlet 136 of the vacuum pump 114 via another conduit 154. The remaining components of the effluent stream may be discharged from the condenser 116 via the vacuum port 152 through the conduit 154. A vacuum isolation valve 155 may be disposed within the conduit 154 to minimize pressure variation in the condenser 116 and in the interior 128 of the distillation chamber 110.

In one form, the condenser 116 may comprise a shell and tube or a plate and frame-type heat exchanger and may include a coolant inlet 156 and a coolant outlet 158. In such case, a coolant may be introduced into the condenser 116 via the coolant inlet 156 and may flow through the condenser 116 in a counter-current fashion relative to the flow of the effluent stream through the condenser 116. Thereafter, the coolant may be discharged from the condenser 116 via the coolant outlet 158.

The liquid condensate may be collected and held within the storage tank 118. The liquid condensate may be discharged from the storage tank 118 through a conduit 160 when the storage tank 118 is full or at any other time and for any other reason. A valve 162 may be disposed within the conduit 160 to control the flow of liquid condensate from the storage tank 118. In one form, the pump 120 may be used to pump the liquid condensate through the conduit 160 to another desired location.

A product 105 may be continuously heated and exposed to the subatmospheric pressure environment within the distillation chamber 110 for a time sufficient to effectively reduce the amount of volatile compounds embodied within the product 105 to a desired level. In one form, a sensor or sampling port 164 may be coupled to the interior 128 of the distillation chamber 110 or to the conduit 140 and may be configured to detect for the presence of one or more volatile compounds within the effluent stream exiting the distillation chamber 110 and/or to determine the concentration of those compounds within the effluent stream. In such case, the product 105 may be continuously heated and exposed to the subatmospheric pressure environment within the distillation chamber 110 until the concentration of one or more volatile compounds within the effluent stream exiting the distillation chamber 110 is nondetectable or is below a predetermine amount. The absence of or the relatively low concentration of volatile compounds within the effluent stream exiting the distillation chamber 110 may provide sufficient evidence that the concentration of volatile compounds embodied within the product 105 have been effectively reduced or eliminated therefrom.

EXAMPLES

The uncontrolled emission of volatile compounds from a product that comprises a polymeric material can be eliminated or reduced by heating the product in a vacuum or a subatmospheric pressure environment for a time sufficient to vaporize and release the volatile compounds from the product. The temperatures and pressures at which the volatile compounds are released from the product may be selected to maximize the rate at which the volatile compounds are released from the product, while also avoiding any negative impacts to various properties, including the structural integrity, dimensional stability, or robustness of the product.

Example 1

Fiber reinforced plastics or polymers (FRPs) are composite materials used in the manufacture of various consumer, commercial, and industrial products, such as in aerospace, marine, and automotive vehicle body panels, high performance sporting goods, building construction materials, components of appliances, chemical tanks, pipes, and electrical equipment. The polymer precursor compositions or resin compositions employed during the FRP fabrication process may contain a stoichiometric excess of monomers, dimers, trimers, tetramers, and/or oligomers of styrene, and these residual styrene or styrenic compounds may become trapped in the resulting FRP products. Some examples of styrenic compounds include: styrene ($C_8H_8$); α-methylstyrene ($C_9H_{10}$); 2,3-diphenyl-1-butene ($C_{16}H_{16}$); 1,3-diphenyl-1-butene ($C_{16}H_{16}$); 1,4-diphenyl-1-butene ($C_{16}H_{16}$); 1-ethyl-2-(2-phenylethenyl)-benzene ($C_{16}H_{16}$); 2,4-diphenyl-4-methyl-1-pentene ($C_{18}H_{20}$); and 2,4-diphenyl-4-methyl-2-pentene ($C_{18}H_{20}$). The presently disclosed extraction process can be used to effectively reduce or eliminate the residual content of styrene and/or other styrenic compounds in these FRP products, without impacting the structural integrity, dimensional stability, or robustness of the products.

Figure 2:
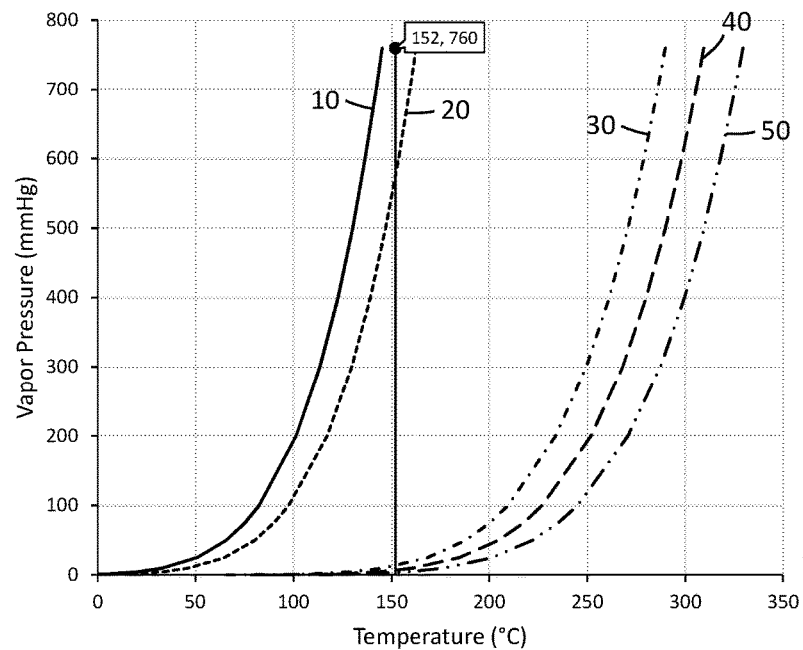
FIG. 2 is a chart of vapor pressure (mmHg) vs. temperature (° C.) for multiple styrene monomers and dimers at pressures up to 760 mmHg (1 atm)

FIG. 2 illustrates a chart of vapor pressure (mmHg) as a function of temperature (° C.) for the following monomers and dimers of styrene: styrene ($C_8H_8$) (solid line, 10); α-methylstyrene ($C_9H_{10}$) (short dashed line, 20); 2,3-diphenyl-1-butene ($C_{16}H_{16}$) (dash-dot line, 30); 1,3-diphenyl-1-butene ($C_{16}H_{16}$) (long dashed line, 40); and 1,4-diphenyl-1-butene ($C_{16}H_{16}$) (dash-dot-dot line, 50) at pressures up to 760 mmHg (1 atm). The heat of vaporization or enthalpy of vaporization ($\Delta H_{vap}$) of the compounds at their boiling points are shown in the table below. The vapor pressure and heat of vaporization data for each compound was obtained from Advanced Chemistry Development, Inc. (ACD/Labs): http://www.acdlabs.com/resources/ilab/. The vapor pressure curves 10, 20, 30, 40, 50 represent the temperatures and pressures at which the gas phase of each compound will be in equilibrium with its condensed phase. As such, the vapor pressure curves 10, 20, 30, 40, 50 can be used to determine the temperatures and pressures required to vaporize and thereby release each of the styrene compounds from an FRP product during the disclosed extraction process.

|  | $\Delta H_{vap}$ (kJ/mol) |
| --- | --- |
| styrene | 36.65 |
| α-methylstyrene | 38.26 |
| 2,3-diphenyl-1-butene | 50.78 |
| 1,3-diphenyl-1-butene | 52.81 |
| 1,4-diphenyl-1-butene | 54.94 |
| 1-ethyl-2-(2-phenylethenyl)-benzene | 53.66 |
| 2,4-diphenyl-4-methyl-1-pentene | 54.92 |
| 2,4-diphenyl-4-methyl-2-pentene | 55.01 |

As shown in FIG. 2, when performed at standard atmospheric pressure (760 mmHg), normal curing temperatures (e.g., about 152° C.) may be sufficient to vaporize and thereby remove residual compounds of styrene ($C_8H_8$) from an FRP product, but will not be effective in the vaporization and removal of α-methylstyrene ($C_9H_{10}$); 2,3-diphenyl-1-butene ($C_{16}H_{16}$); 1,3-diphenyl-1-butene ($C_{16}H_{16}$); or 1,4-diphenyl-1-butene ($C_{16}H_{16}$) from the FRP product. This is because the boiling point of styrene ($C_8H_8$) at standard atmospheric pressure is about 145° C., which is below normal curing temperatures of about 152° C. However, due to their relatively high boiling points (about 163° C., 290° C., 309° C., and 328° C., respectively), α-methylstyrene ($C_9H_{10}$); 2,3-diphenyl-1-butene ($C_{16}H_{16}$); 1,3-diphenyl-1-butene ($C_{16}H_{16}$); and 1,4-diphenyl-1-butene ($C_{16}H_{16}$) will not vaporize when the FRP product is cured at normal curing temperatures of about 152° C.

Figure 3:
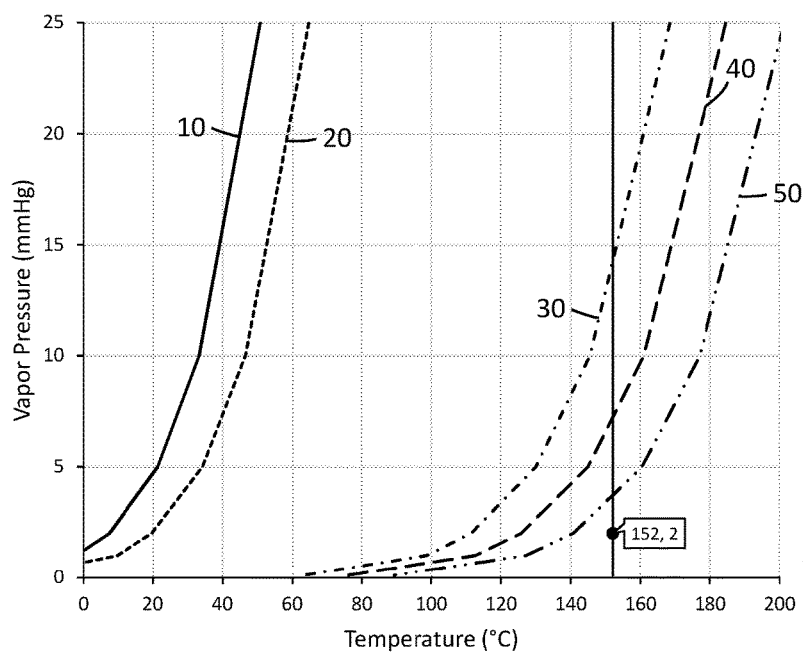
FIG. 3 is a chart of vapor pressure (mmHg) vs. temperature (° C.) for the same styrene monomers and dimers illustrated in FIG. 2 at subatmospheric pressures up to 25 mmHg (~0.033 atm)

However, referring now to FIG. 3, heating the FRP product at a temperature of 152° C. while exposing the FRP product to a subatmospheric pressure of 2 mmHg can effectively vaporize and extract styrene (Cab); α-methylstyrene ($C_9H_{10}$); 2,3-diphenyl-1-butene ($C_{16}H_{16}$); 1,3-diphenyl-1-butene ($C_{16}H_{16}$); and 1,4-diphenyl-1-butene ($C_{16}H_{16}$) from the FRP product. Therefore, the volatile compound extraction process described herein can be used to effectively extract one or more volatile compounds from an FRP product, without heating the FRP product above normal processing temperatures.

In addition, because the volatile compound extraction process can be performed at relatively low temperatures (e.g., at normal curing temperatures), it may be performed simultaneously or subsequent to other heat treatment stages in the FRP fabrication or finishing process. For example, the volatile compound extraction process described herein may be performed during or after an FRP product is cured or partially cured and also may be performed in the same chamber.

Example 2

Polymeric adhesives and sealers are commonly used during the assembly of vehicle shells to join body panels to each other or to form a seal between body panels or along a hemmed portion of a body panel. For example, beads or strips of polymeric adhesives and sealers are commonly applied between overlapping vehicle body panels and along hemmed or flanged edge portions of vehicle body panels. To help tailor the rheological and thixotropic properties of the polymeric adhesives and sealers, solvents and other volatile compounds (e.g., plasticizers) are typically added to the adhesive and sealer precursor compositions. However, residual amounts of these volatile compounds may become trapped in the beads or strips of adhesive or sealer after curing. The presently disclosed extraction process can be used to effectively reduce or eliminate the amount of residual volatile compounds from a product fabricated with polymeric adhesives and sealers, without impacting the structural integrity, dimensional stability, or robustness of the product.

Figure 4:
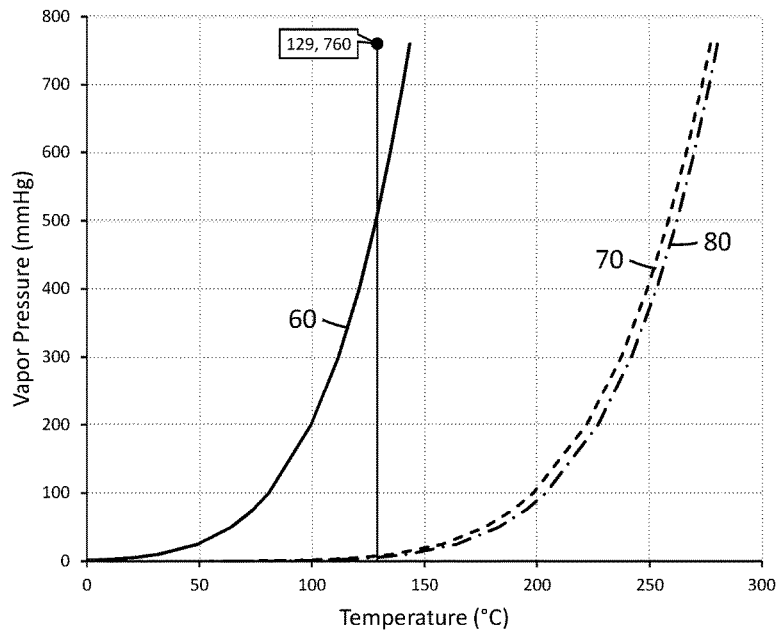
FIG. 4 is a chart of vapor pressure (mmHg) vs. temperature (° C.) for multiple volatile compounds found in adhesives and sealers at pressures up to 760 mmHg (1 atm)

FIG. 4 illustrates a chart of vapor pressure (mmHg) as a function of temperature (° C.) for the following volatile compounds: 2-methyloctane ($C_9H_{20}$) (solid line, 60); 2-methyl pentadecane ($C_{16}H_{34}$) (dashed line, 70); and 2,2,4-trimethyl-1,3-pentanediol diisobutyrate (TXIB) ($C_{16}H_{3004}$) (dash-dot line, 80); at pressures up to 760 mmHg (1 atm). The heat of vaporization or enthalpy of vaporization ($\Delta H_{vap}$) of the volatile compounds at their boiling points are shown in the table below. The vapor pressure and heat of vaporization data for each compound was obtained from Advanced Chemistry Development, Inc. (ACD/Labs): http://www.acdlabs.com/resources/ilab/.

|  | $\Delta H_{vap}$ (kJ/mol) |
|---|---|
| 2-methyloctane ($C_9H_{20}$) | 36.48 |
| 2-methyl pentadecane ($C_{16}H_{34}$) | 49.48 |
| TXIB ($C_{16}H_{30}O_4$) | 51.87 |

Figure 5:
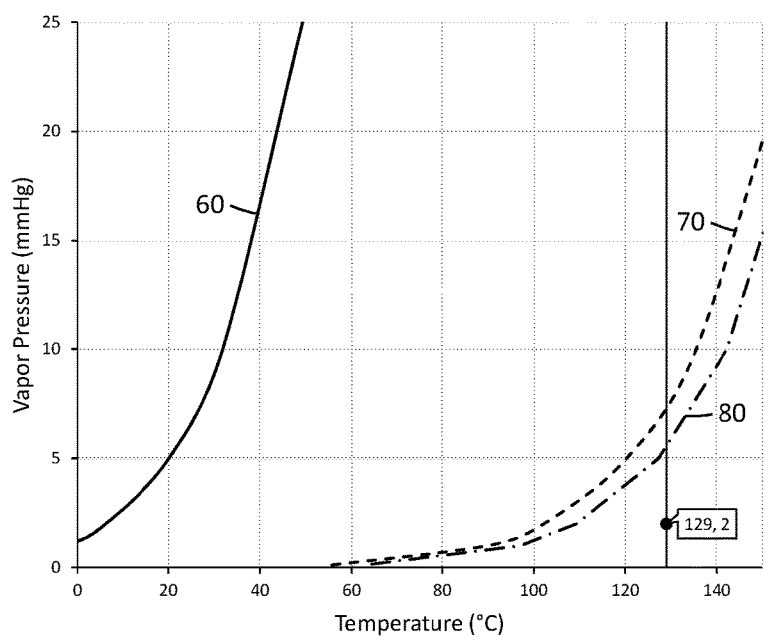
FIG. 5 is a chart of vapor pressure (mmHg) vs. temperature (° C.) for the same volatile compounds illustrated in FIG. 4 at subatmospheric pressures up to 25 mmHg (~0.033 atm).

As shown in FIG. 4, when performed at standard atmospheric pressure (760 mmHg), normal curing temperatures (e.g., about 129° C.) will not vaporize and thus will not effectively remove of 2-methyloctane ($C_9H_{20}$); 2-methyl pentadecane ($C_{16}H_{34}$); or TXIB ($C_{16}H_{30}O_4$) from a product fabricated with polymeric adhesives or sealers comprising these compounds. This is because the normal boiling points of 2-methyloctane ($C_9H_{20}$), 2-methyl pentadecane ($C_{16}H_{34}$), and TXIB ($C_{16}H_{30}O_4$) are below 129° C. (i.e., about 143° C., 277° C., and 280° C., respectively). However, referring now to FIG. 5, heating the product at a temperature of 129° C. while exposing the product to a subatmospheric pressure of 2 mmHg can effectively vaporize and extract 2-methyloctane ($C_9H_{20}$); 2-methyl pentadecane ($C_{16}H_{34}$); and TXIB ($C_{16}H_{30}O_4$) from the product. Therefore, the volatile compound extraction process described herein can be used to effectively extract one or more volatile compounds from a product fabricated with polymeric adhesives and/or sealers, without having to heat the product above normal processing temperatures. In one form, the presently disclosed extraction process may be performed such that one or more target volatile compounds are extracted from a product, without extracting all volatile compounds from the product. For example, the presently disclosed process may be performed such that certain solvent compounds are extracted from the product, without extracting all of the plasticizer compounds.

In addition, because the volatile compound extraction process can be performed at relatively low temperatures (e.g., at normal curing temperatures), it may be performed simultaneously or subsequent to other heat treatment processes. For example, the volatile compound extraction process described herein may be performed during or after a product fabricated with polymeric adhesives and/or sealers is cured or partially cured and also may be performed in the same chamber as that used to cure the adhesives and/or sealers.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A process for reducing volatile compound emissions from a product, the process comprising:
   positioning a product comprising a polymeric material in a chamber;
   establishing a subatmospheric pressure environment within the chamber;
   heating the product within the chamber to a temperature sufficient to vaporize a volatile compound contained within the polymeric material; and
   withdrawing a gaseous stream comprising vapors of the volatile compound from the chamber, and
   wherein the product comprises at least one of a vehicle body panel or a vehicle shell.

2. The process set forth in claim 1 wherein the polymeric material comprises at least one polymer or copolymer selected from the group consisting of: acetals; acrylics; acrylonitrile-butadiene-styrene; alkyds; diallyl phthalate; epoxy; fluorocarbons; melamine-formaldehyde; nitrile resins; phenolics; polyamides; polyamide-imide; poly(aryl ether); polycarbonate; polyesters; polyimides; polymethylpentene; polyolefins; polyphenylene oxide; polyphenylene sulfide; polyurethanes; silicones; styrenics; sulfones; urea-formaldehyde; vinyls; and combinations thereof.

3. The process set forth in claim 1 wherein the volatile compound comprises a compound having a normal boiling point less than 100° C. at standard atmospheric pressure.

4. The process set forth in claim 1 wherein the volatile compound comprises a compound having a normal boiling point greater than or equal to 100° C. at standard atmospheric pressure and a vapor pressure less than or equal to 5 mmHg at 20° C.

5. The process set forth in claim 4 wherein the product is heated in step (c) at a temperature below the normal boiling point of the volatile compound.

6. The process set forth in claim 1 wherein the volatile compound comprises an organic compound.

7. The process set forth in claim 1 wherein the product comprises a fiber reinforced polymer.

8. The process set forth in claim 7 wherein the volatile compound comprises a styrenic compound, a subatmospheric pressure of less than or equal to 2 mmHg is established within the chamber, and the product is heated in step (c) at a temperature greater than or equal to 150° C.

9. The process set forth in claim 1 wherein the polymeric material comprises a polymeric adhesive or sealer.

10. The process set forth in claim 9 wherein the volatile compound comprises an organic solvent or a plasticizer, a subatmospheric pressure of less than or equal to 2 mmHg is established within the chamber, and the product is heated in step (c) at a temperature greater than or equal to 125° C.

11. The process set forth in claim 1 wherein the volatile compound comprises a compound having a heat of vaporization in the range of 5 kJ/mol to 150 kJ/mol.

12. The process set forth in claim 1 comprising:
    condensing at least a portion of the vapors withdrawn from the chamber to a liquid phase to produce a liquid condensate comprising the volatile compound.

13. The process set forth in claim 1 comprising: delivering the liquid condensate comprising the volatile compound to a storage tank.

14. A system for reducing volatile compound emissions from products, the system comprising:
- a distillation chamber configured to enclose a product comprising a polymeric material, wherein the product comprises at least one of a vehicle body panel, a vehicle shell, a polymeric adhesive or sealer applied to a vehicle body panel, or a combination thereof;
- a vacuum pump configured to establish a subatmospheric pressure environment in the distillation chamber;
- a heater configured to heat the product within the distillation chamber to a temperature sufficient to vaporize a volatile compound embodied in the polymeric material; and
- a condenser configured to receive a gaseous stream comprising vapors of the volatile compound from the distillation chamber and to convert at least a portion of the vapors to a liquid phase.

15. The process set forth in claim 1 wherein the product is heated in step (c) at a temperature greater than or equal to 50° C. and less than or equal to 175° C.

16. The process set forth in claim 1 wherein the product is heated in step (c) at a temperature of 152° C.

17. The process set forth in claim 1 wherein the volatile compound comprises a saturated hydrocarbon, an unsaturated hydrocarbon, an aromatic hydrocarbon, a halogenated hydrocarbon, formic acid, methanol, or a combination thereof.

18. A process for reducing volatile compound emissions from a product, the process comprising:
- positioning a product comprising a polymeric material in a chamber;
- establishing a subatmospheric pressure environment within the chamber;
- heating the product within the chamber to a temperature sufficient to vaporize a volatile compound contained within the polymeric material; and
- withdrawing a gaseous stream comprising vapors of the volatile compound from the chamber, and
- wherein the product comprises a polymeric adhesive or sealer applied to a vehicle body panel.

19. The process set forth in claim 18 wherein the volatile compound comprises an organic solvent, and wherein the organic solvent comprises an alcohol, acetate, saturated, unsaturated, or aromatic hydrocarbon, ether, ester, or a combination thereof.

20. The process set forth in claim 18 wherein the volatile compound comprises a plasticizer, and wherein the plasticizer comprises an adipate, azelate, benzoate, epoxy, ester, mellitate, trimellitate, phosphate, phthalate, polybutene, sebacate, sulfonamide, terephthalate, orthophthalate, or a combination thereof.

* * * * *